C. B. KIMBALL.
CORN HUSKING MACHINE.
APPLICATION FILED MAY 23, 1910.
978,169.
Patented Dec. 13, 1910.
2 SHEETS—SHEET 1.
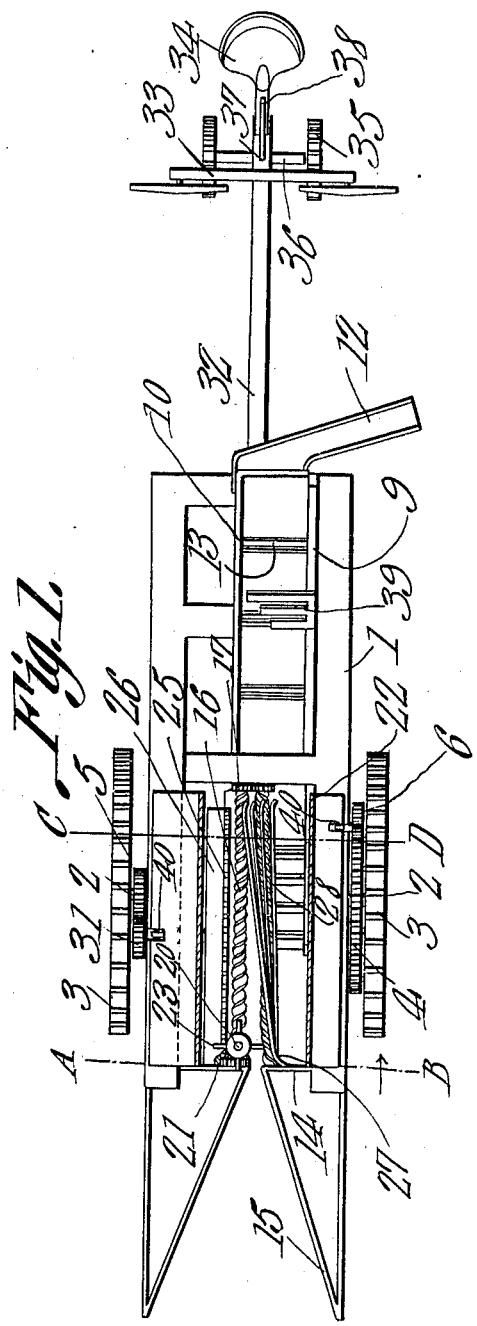
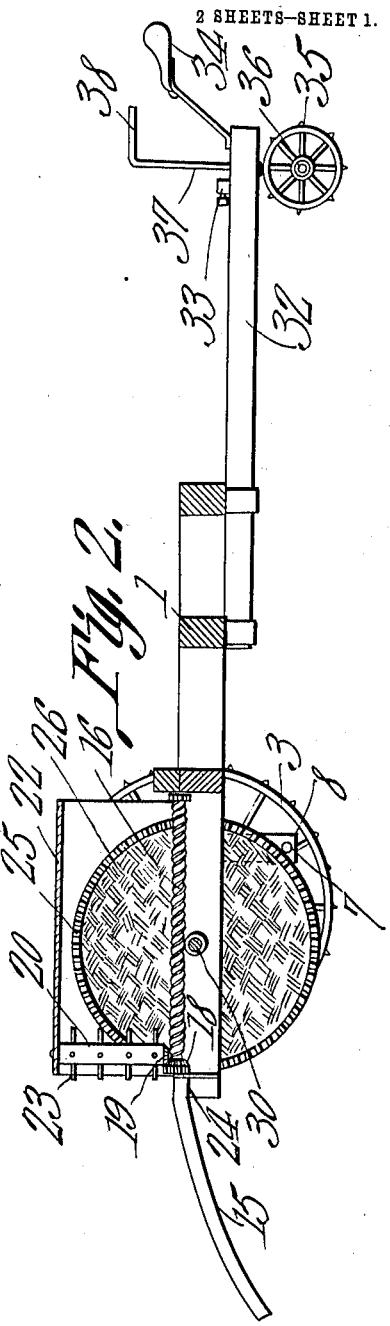
Witnesses
Charles B. Kimball,
Inventor
by C.A.Snow&Co.
Attorneys

C. B. KIMBALL.
CORN HUSKING MACHINE.
APPLICATION FILED MAY 23, 1910.

978,169.

Patented Dec. 13, 1910.
2 SHEETS—SHEET 2.

Witnesses

Charles B. Kimball,
Inventor
by C. A. Snow & Co.
Attorneys

UNITED STATES PATENT OFFICE.

CHARLES BYRON KIMBALL, OF PINE RIVER, WISCONSIN.

CORN-HUSKING MACHINE.

978,169. Specification of Letters Patent. Patented Dec. 13, 1910.

Application filed May 23, 1910. Serial No. 562,877.

*To all whom it may concern:*

Be it known that I, CHARLES BYRON KIMBALL, a citizen of the United States, residing at Pine River, in the county of Waushara and State of Wisconsin, have invented a new and useful Corn-Husking Machine, of which the following is a specification.

This invention relates to machines for husking corn and its object is to provide a compact machine of this type which can be readily directed along the rows of corn and will operate to strip the ears from the stalks and to remove the husks, after which the ears will be discharged from one side of the machine and into a wagon provided therefor.

Another object is to provide improved means for removing the husks from the ears.

With these and other objects in view the invention consists of certain novel details of construction and combinations of parts hereinafter more fully described and pointed out in the claims.

In the accompanying drawings the preferred form of the invention has been shown.

Figure 3:
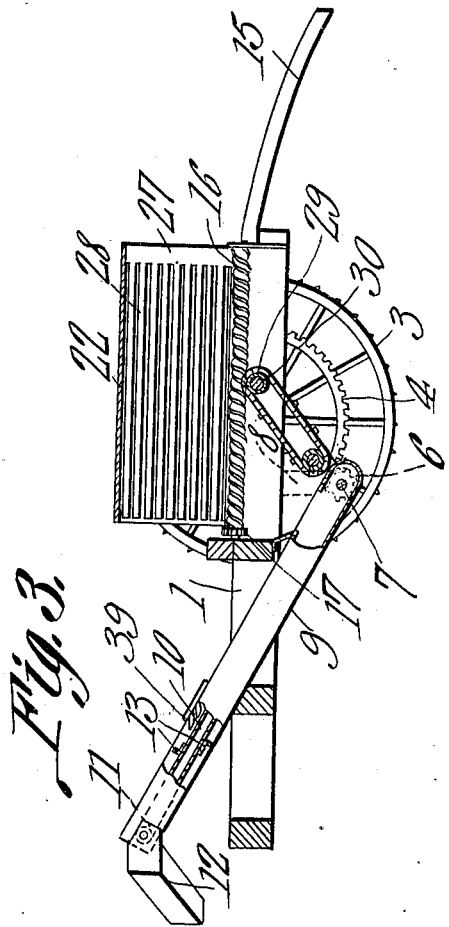
Figure 5:
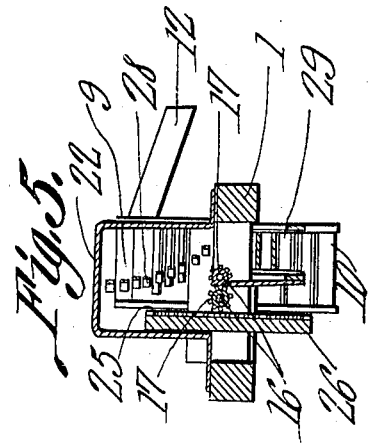
Figure 4:
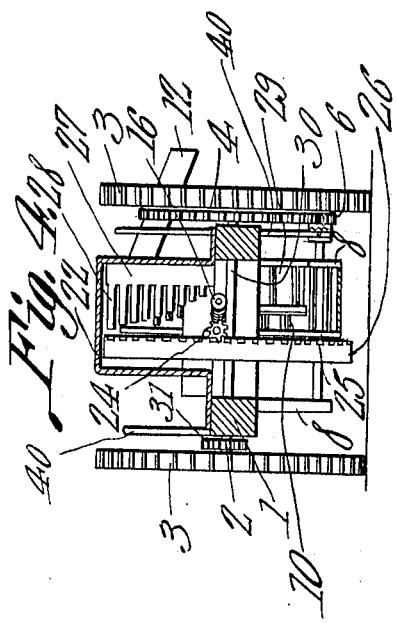

In said drawings:—Figure 1 is a plan view of the machine, the housing of the husking mechanism being shown in section. Fig. 2 is a central vertical longitudinal section through the machine. Fig. 3 is a central vertical longitudinal section through a portion of said machine and looking in a direction opposite to that shown in Fig. 2. Fig. 4 is a section on line A—B Fig. 1, the feed roll being removed. Fig. 5 is a section on line C—D Fig. 1.

Referring to the figures by characters of reference 1 designates the main frame of the machine, the same being provided with trunnions 2 projecting into the supporting wheels 3. One of these wheels has a gear 4 secured thereto and adapted to rotate therewith while the other wheel has a smaller gear 5 secured to it so as to rotate therewith. The gear 4 meshes with a smaller gear 6 secured to a shaft 7 which is mounted in suitable hangers extending downward from the frame as indicated at 8, this shaft being extended through the lower end of an inclined casing 9 in which is mounted an endless elevator or conveyer 10. This conveyer is mounted at its ends upon supporting rollers or sprockets 11 and an inclined chute 12 extends laterally from the upper end of the casing 9 and is adapted to receive material elevated by the conveyer and direct it into a wagon or the like located at one side of the machine. The conveyer has a series of outstanding wings 13 for engaging the material and positively moving it upwardly.

The front end of the frame 1 is open and has transverse strips 14 secured to the sides thereof and spaced apart at their inner ends these strips at the front end of the frame supporting downwardly and forwardly inclined gathering members 15. Rearwardly converging snapping rollers 16 are journaled within the transverse plates or strips 14 and within the back portion of the frame 1, each of these rollers being provided, at its rear end, with a gear 17, the two gears meshing as shown so as to insure the simultaneous rotation of the rollers in opposite directions. Both of the rollers have spiral ribs thereon adapted to feed the stalks and ears toward the rear ends of the rollers. One of the said rollers has a gear 18 at its front end meshing with a gear 19 formed at or secured to the lower end of a vertical feed roller 20. This feed roller is journaled at its lower end in an arm or bracket 21 extending from one of the cross strips 14 and at its upper end in a hood or casing 22 which extends over and is secured to the frame 1. This roller 20 has pins or teeth 23 extending radially therefrom and adapted to engage the stalks and ears and force them backwardly between the stripping rollers 16. Another gear 24 is connected to the gear 18 and rotates therewith, and meshes with teeth 25 formed along the margin of a husking disk 26. This disk rotates in a vertical plane and is located close to one of the stripping rolls 16 and is of such diameter as to extend practically throughout the length of the said roller 16. The working face of the disk is roughened or formed with outstanding ribs arranged irregularly upon the disk.

A spring plate 27 is secured to one of the cross strips 14 and parallel with the feed roller 20 and this plate has rearwardly extending superposed spring fingers 28 extending from it, certain of the fingers overhanging the pass between the stripping rollers 16 and extending close to the rear portion of the husking disk 26. That portion of the frame 1 which is directly under the pass between the roller 16 and under the husking disk 26 is preferably open and a draper 29 is preferably located under that portion of the frame extending below the fingers 28 and up to the stripping roller 16. This draper is adapted to direct corn to the elevator 10.

The husking disk 26 and draper 29 are secured to and move with a shaft 30 extending transversely of the frame 1, and having a gear 31 at one end which meshes with and is actuated by the gear 5. A tongue 32 extends rearwardly from the frame 1 and an evener 33 is connected to the rear portion thereof, it being understood that the draft animals are to be located at opposite sides of the tongue 32 and in the rear of the frame 1. The driver's seat 34 may be mounted on the rear portion of the tongue and the steering wheels 35 support an axle 36 from which extends a pivot rod 37 projecting upwardly through the tongue. This rod has a handle or lever 38 connected to it and adapted to be actuated by the driver, whereby the machine can be readily guided. Spring fingers 39 are secured to the casing 9 and extend across the elevator 10 and serve to complete the stripping operation before the corn is discharged into the chute 12.

When the machine is moved forward along a row of corn, the gathering members 15 will guide the stalks between the inner or adjoining ends of the cross strips or plates 14 where they will be engaged by the pins or teeth upon the roller 20. This roller is driven by the gears 19 and 18, motion being transmitted to them through gears 24 and 25 from the shaft 30, gears 31 and 5 and one of the supporting wheels 3. The stalks will be pressed backwardly and downwardly by the roller 20 and its pins or teeth so that they will become engaged by the stripping or snapping rolls 16. These rolls rotate in opposite directions, the adjacent portions moving upwardly so as to engage the stalks and pull upwardly upon them, thus stripping the ears from the stalks. The spiral ribs will move the detached ears rearwardly within the machine and the spring fingers 28 will yieldingly press all of these ears laterally so that they will assume positions upon the roll 16 which is nearest the disk 26. As the disk 26 rotates at a high speed, the ears supported in contact therewith by the right hand roll 16 and pressed against the disk by the fingers 28, will have their husks torn and shredded by the roughened surface of the disk, the roll 16, in the meanwhile, operating to force the ears toward the rear end of the roll. The husks will thus be torn from the ears and dropped between the disk 26 and the adjacent roll 16 and as soon as the ears are released from the husks which are engaged by and project between the disk 26 and the adjacent roll, said ears will be shifted laterally by other unhusked ears being fed toward the rear of the machine, the freed husked ears thus serving to press against the fingers 28 with sufficient force to cause them to yield and permit the ears to drop on to the draper 29. This draper will direct the ears on to the endless conveyer or elevator 10 which will lift the ears to the chute 12. This chute will in turn direct them into a wagon or other receptacle located at one side of the machine. In passing upward to the chute, the ears will move under the fingers 39 and these fingers will yieldingly engage them and tear off any husks or portions thereof adhering to the ears. Clutches operated by levers, such as shown at 40, may be used for placing the gears 31 and 6 in or out of operative relation with said shafts 30 and 7 respectively.

Various changes can of course be made in the construction and arrangement of the parts without departing from the spirit or sacrificing any of the advantages of the invention as defined in the appended claims.

What is claimed is:—

1. A corn husker including a roller having a spiral conveying rib, a husking disk mounted for rotation and extending throughout the length of the roller and disposed adjacent thereto, said roller constituting means for directing the detached ears against, and for moving them along the face of the disk, said roller and disk coöperating to remove the husks from the ears, and superposed yielding fingers for contacting with and holding the ears in contact with the rear portion of the disk.

2. A corn husking machine including a roller, a husking disk mounted for rotation adjacent the roller, and extending throughout the length thereof, said roller constituting means for directing the detached ears against, and for moving them along the working face of the disk, said roller and disk coöperating to remove the husks from the ears, laterally yieldable fingers for holding the ears in contact with the rear portion of the disk, and revoluble means for feeding ears to the roller and between the disk and fingers.

3. A corn husking machine including a frame, a husking disk mounted for rotation in a substantially vertical plane, superposed laterally yielding fingers converging rearwardly toward the disk and a roller interposed between the fingers and disk, said roller constituting means for directing the detached ears against, and for moving them along the working face of the disk, said roller and disk coöperating to remove the husks from the ears.

4. A corn husking machine including a frame, a husking disk mounted for rotation in a vertical plane, superposed laterally yielding fingers converging rearwardly toward said disk, a roller interposed between the disk and fingers, certain of said fingers overhanging the roller, said roller constituting means for directing the detached ears against, and for moving them along the working face of the rotating disk, said roller and disk coöperating to remove the husks from the ears, means for actuating the disk and roller and an upstanding feed roller operated by the first mentioned roller for directing material between the fingers and disk.

In testimony that I claim the foregoing as my own, I have hereto affixed my signature in the presence of two witnesses.

CHARLES BYRON KIMBALL.

Witnesses:
 BERT W. SORENSEN,
 RAY H. BUNKER.